US005744561A

United States Patent [19]
Kappler

[11] Patent Number: 5,744,561
[45] Date of Patent: Apr. 28, 1998

[54] FLUORINATED POLYMER HAVING IMPROVED HEAT STABILITY

[75] Inventor: Patrick Kappler, Ecully, France

[73] Assignee: Elf Atochem S.A., Puteaux, France

[21] Appl. No.: 541,068

[22] Filed: Oct. 11, 1995

[30] Foreign Application Priority Data

Oct. 14, 1994 [FR] France ................. 94 12281

[51] Int. Cl.[6] .................................. C08F 14/18
[52] U.S. Cl. ............... 526/255; 427/120; 427/163.2; 427/388.4; 427/388.5; 428/421
[58] Field of Search ................. 526/255; 427/120, 427/163.2, 388.4, 388.5; 428/421

[56] References Cited

U.S. PATENT DOCUMENTS 2,456,255  12/1948  Coffman et al. ............... 526/255
3,654,210   4/1972  Kuhls et al.

FOREIGN PATENT DOCUMENTS 2132463  1/1973  Germany ............... 526/255

OTHER PUBLICATIONS

Ye. L. Gal'perin and D. Ya. Tsvankin, "The Melting Temperature and the Structure of Fluorine Containing Polymers", in Polymer Science U.S.S.R., 1976, vol. 38, pp. 3073–3083.

*Primary Examiner*—Joseph L. Schofer
*Assistant Examiner*—N. Sarafin
*Attorney, Agent, or Firm*—Pennie & Edmonds LLP

[57] ABSTRACT

The invention relates to the use of fluorinated copolymers based on trifluoroethylene (VF3) and tetrafluoroethylene ($C_2F_4$), having melting points above 210° C. and soluble in the customary polar solvents, as protective coatings for a variety of substrates (plates, wires, cables, fibers, etc.) in the form of extruded films or sheaths or in the form of varnishes and paints.

10 Claims, No Drawings

FLUORINATED POLYMER HAVING IMPROVED HEAT STABILITY

FIELD OF THE INVENTION

This invention relates to fluorinated polymers having good heat stability, i.e. whose melting point is equal to or above 210° C. This invention relates also to the use of such polymers as protective coatings for a variety of substrates, for example in the form of varnishes and paints for metal substrates, glass, wood, and so on, or in the form of extruded or coextruded films or sheaths.

BACKGROUND OF THE INVENTION

Fluorinated homopolymers and copolymers are known for their good heat stability, their chemical resistance, especially to solvents, weather resistance and resistance to radiation (such as UV), their impermeability to gases and liquids, and their electrical insulating properties. Nevertheless, fluorinated polymers with melting points above about 170° C. have the disadvantage of generally being very sparingly soluble or even insoluble in customary polar organic solvents such as acetates and ketones.

Compared with others fluorinated polymers in the literature, those involved in the present invention have both a high melting point (cf. GAL'PERIN et al., *Polymer Science USSR*, 1976, Vol. 18, p. 3073–3083, Pergamon Press Pub.) and a good solubility in polar organic solvents without their solution viscosity in this type of solvent being too high, especially in the case of solutions with a solids content of more than 10% by weight. Examples of polar organic solvents which may be mentioned in particular are methyl, isopropyl, and butyl acetates, acetone, methyl ethyl ketone, methyl isobutyl ketone, tetrahydrofuran, dimethylformamide, and dimethylacetamide.

Apart from the properties referred to above, the copolymers employed in the present invention also have a low refractive index, good flexibility (modulus of rigidity of between 150 and 350 MPa), and viscosity as well as transparency after stretching.

SUMMARY OF THE INVENTION

The present invention provides a method of protecting a substrate which comprises the step of coating the substrate with one or more heat stable fluorinated copolymers of trifluoroethylene and tetrafluoroethylene, said coplymer(s) preferably comprising from 96 to 70 mol % trifluoroethylene, and from 4 to 30 mol % tetrafluoroethylene.

In one embodiment, the coating step is preceded by a step which comprises mixing said one or more heat stable fluorinated copolymers of trifluoroethylene and tetrafluoroethylene with an organic or aqueous phase to form a varnish or paint. In this embodiment, the coating step comprises applying the varnish or paint to the substrate and subsequently removing the organic or aqueous phase. In another embodiment, the coating step is preceded by a step which comprises extruding or coextruding a monolayer or multilayer film, sheath, or sleeve comprising the heat stable fluorinated copolymer of trifluoroethylene and tetrafluoroethylene. In this embodiment, the coating step comprises applying the monolayer or multilayer film, sheath, or sleeve to the substrate.

The present invention likewise contemplates an article of manufacture comprising a substrate, for instance aluminum or an electrical circuit or an optical fiber, coated with one or more heat stable trifluoroethylene/tetrafluoroethylene copolymers as described above. In addition to coated substrates, the present invention contemplates articles of manufacture, for instance, sheaths, plates, ferrules, tips, nipples, terminals, and connectors, wherein the article is comprised of one or more heat stable fluorinated copolymers of trifluoroethylene and tetrafluoroethylene as described above.

This invention also includes a process for the preparation of a fluorinated copolymer of from 96 to 70 mol % of trifluoroethylene and from 4 to 30 mol % of tetrafluoroethylene. The process comprises the steps of forming an emulsion, suspension, or solution of about 96 to 70 mol % trifluoroethylene, about 4 to 30 mol % tetrafluoroethylene, and a catalytically effective amount of free-radical initiator and polymerizing the trifluoroethylene and tetrafluoroethylene to form the fluorinated copolymer. The free-radical initiator is preferably a percarbonate, perpivalate, or potassium persulphate. The polymerization step is conducted under reaction conditions described below to form a fluorinated copolymer having a number-average molecular weight between about 40,000 and 250,000 and having a polydispersity between about 1.7 and 2.9.

DESCRIPTION OF THE PREFERRED EMBODIMENTS

The polymers according to the invention are based on trifluoroethylene (VF3) and tetrafluoroethylene ($C_2F_4$) and preferably consist of:

1. from 96 to 70 mol % of trifluoroethylene (VF3),
2. from 4 to 30 mol % of tetrafluoroethylene ($C_2F_4$).

Their number-average molecular weight, Mn, is generally between 40,000 and 250,000 and their polydispersity, Mw/Mn, wherein Mw is their weight-average molecular weight, is generally between 1.7 and 2.9.

The polymers of the present invention are "heat stable". That is, their melting point is at least 210° C.

They can be prepared by the polymerization techniques employed for the synthesis of fluorinated polyolefins. There may be mentioned emulsion, suspension, or solution polymerization in the presence of one or more polymerization initiators, preferably of the free-radical type, such as percarbonates, perpivalates, or potassium persulphate.

The polymerization is generally carried out under a pressure of between 10 and 90 bar and the polymerization temperature is generally between 40° and 120° C. and preferably between 50° and 90° C.

Emulsion polymerization requires the use of an emulsifier, which can be selected for example from the fluorinated emulsifiers of the formula $C_nF_{2n+1}COOM$ or $C_nF_{2n+1}C_2H_4SO_3M$, where M is the sodium, potassium, or ammonium cation.

Suspension polymerization requires the use of a protective colloid, which is generally selected from polyvinyl alcohols or cellulose derivatives.

To prepare the varnishes and paints based on copolymers described above which are intended especially for the protection of electrical circuits against corrosion, the copolymers are dissolved or emulsified in an organic solvent or, if appropriate, dispersed in an aqueous medium to produce paints in the aqueous phase. The copolymers can be used by themselves or in association with other fluorinated or non-fluorinated polymers such as polyvinylidene fluoride (PVDF), acrylic polymers, for example polymethyl methacrylate (PMMA), and so on.

The copolymers according to the invention can also be extruded or coextruded at temperatures of between 250° and 300° C., making it possible to produce protective coatings in the form of monolayer or multilayer sheaths or sleeves (coating of cylindrical objects, cables, wires, fibers) or in the form of monolayer or multilayer films (coating of flat objects).

By virtue of their low refractive index, one particularly advantageous application of the copolymers involves their use in the field of optical fibers, where they can be used either in the form of varnishes or paints or in the form of an extruded sheath as a protective coating for the core of the optical fibers.

Compared with the other fluorinated polymers used as protective coatings for optical fibers, the copolymers according to the invention have the additional advantage of a greatly improved heat stability.

EXAMPLES

For the polymers synthesized in the following Examples, the molecular weights were determined by gas chromatography in tetrahydrofuran (THF) at room temperature with a refractometric detector. The number-average and weight average molecular weights, Mn and Mw, are expressed in polystyrene equivalents. The proportions of the different monomers were confirmed by nuclear magnetic resonance (NMR) and are expressed in mol %.

Their Brookfield viscosity in 12 or 20% by weight solution in methyl acetate is measured; the results are indicated in Pa.s.

Their melting point, m.p., is measured by differential scanning calorimetry (DSC) with a temperature rise of 10° C. per minute.

The transparency of these polymers after 200% uniaxial stretching is also assessed qualitatively. Polymer strips 0.7 mm thick are molded and then stretched to twice their initial length. The transparency of the samples is assessed visually.

The results of the measurements described above for the polymers of Examples 1 to 8, are collated in Table 1.

Example 1

The following are introduced into a 3.3 liter autoclave equipped with a stirrer, a jacket, and a temperature regulating system:

| | |
|---|---|
| deionized water | 2 liters |
| potassium persulphate | 0.5 grams |
| sodium acetate | 0.3 grams |
| paraffin | 8 grams |
| emulsifier ($C_6F_{13}C_2H_4SO_3K$) | 2.45 grams |

After removal of the atmospheric oxygen, 150 grams of VF3 and 23 grams of $C_2F_4$ are introduced and the temperature of the autoclave is increased to 80° C. The pressure is maintained at 24 bar by the introduction of a gaseous mixture of VF3 and $C_2F_4$ of molar composition 90/10. After the addition of 100 grams of VF3/$C_2F_4$ mixture, 2.5 milliliters of ethyl acetate are added, followed by 1057 grams of the above gaseous VF3/$C_2F_4$ mixture, the temperature of the autoclave is then lowered to 30° C. and the autoclave is degassed.

A latex with a high solids content (36.8%) is formed. This is coagulated by freezing and then washed 3 times with 3 liters of a water/methanol mixture of composition 75/25 by weight. After washing, the latex is dried at 90° C. and 1031 grams of VF3/$C_2F_4$ copolymer are recovered in the form of a powder of molar composition 90/10.

The copolymer obtained is soluble in butyl acetate. Its flexural modulus of elasticity, measured according to standard ISO 12086/2, is equal to 250 MPa and its viscosity, measured with a capillary rheometer at 300° C. for a shear of 100 s$^{-1}$, is equal to 900 Pa.s Its refractive index is measured as follows: after cryogenic grinding of a polymer sample to a particle size of less than 10 μm (the edges of the ground particles must be well defined and not jagged), an optical microscope is used to compare its refractive index with those of solvents of known index in which it is immersed. Ethanol and isopropanol were used as reference solvents. The refractive index is equal to 1.372±0.003.

Example 2

The following are introduced into a 3.3 liter autoclave equipped with a stirrer, a jacket, and a temperature regulating system:

| | |
|---|---|
| deionized water | 2 l |
| potassium persulphate | 0.4 g |
| paraffin | 8 g |
| emulsifier ($C_6F_{13}C_2H_4SO_3K$) | 2.45 g |
| VF3 | 1200 g |

After the autoclave has been heated to 83° C., 0.08 g of potassium persulphate and 100 g of deionized water are introduced. The pressure is adjusted to 85 bar by the addition of 90 g of water. Further water is added to compensate the pressure drop due to the polymerization of the VF3. After the addition of 780 g of water and 0.08 g of potassium persulphate introduced in 4 portions at a rate of one injection per hour, the temperature of the autoclave is lowered to 40° C. and the autoclave is degassed.

A latex with a high solids content (29%) is formed. This is coagulated by freezing and then washed 3 times with 3 liters of a water/methanol mixture of composition 75/25 by weight. After washing, the latex is dried at 90° C. and 975 g of VF3 homopolymer are recovered in the form of a powder.

The copolymer obtained is soluble in butyl acetate.

Example 5

This Example corresponds to a VF2/$C_2F_4$ polymer marketed by Elf Atochem S.A. under the tradename KYNAR™SL.

Example 6

1400 g of deionized water and then 39.5 ml of a 1% by weight solution of hydroxyethyl cellulose are introduced into a 3.3 liter autoclave equipped with a stirrer, a jacket, and a temperature regulating system. After deaeration of the autoclave, 5 g of $C_2F_3Cl$, 1062 g of VF3, and 12 ml of ethyl acetate are introduced.

After the autoclave has been heated to 50° C., 760 g of deionized water and 3 g of cyclohexyl perdicarbonate dissolved in 52 g of $CCl_2FCH_3$ (FORANE™ 141 b) are introduced. The pressure inside the autoclave is then 85 bar. It is maintained at this value by the addition of water. $C_2F_3Cl$ is also added, being introduced in 8 g portions, and 25 g of

| | |
|---|---|
| sodium acetate | 0.3 g |
| paraffin | 8 g |
| emulsifier ($C_6F_{13}C_2H_4SO_3K$) | 2.45 g |

After removal of the atmospheric oxygen, the temperature is increased to 82° C. and 150 g of a $VF3/C_2F_4$ mixture of molar composition 80/20 are introduced so as to create a pressure of 24 bar. After the introduction of 99 g of gaseous $VF3/C_2F_4$ mixture of molar composition 80/20, 1 ml of ethyl acetate is added, followed by a further 690 g of the above $VF3/C_2F_4$ mixture. The temperature of the autoclave is lowered to 30° C. and the autoclave is degassed.

A latex with a high solids content (31%) is formed. This is coagulated by freezing and then washed 3 times with 3 liters of a water/methanol mixture of composition 75/25 by weight. After washing, the latex is dried at 90° C. and 895 g of $VF3/C_2F_4$ copolymer are recovered in the form of a powder of molar composition 80/20.

The copolymer obtained is soluble in butyl acetate. Its flexural modulus of elasticity, measured according to standard ISO 12086/2, is equal to 250 MPa and its viscosity, measured with a capillary rheometer at 300° C. for a shear of 100 $s^{-1}$, is equal to 900 Pa.s.

EXAMPLES 3 to 8 (comparative)

Example 3

This example corresponds to a VF2 homopolymer marketed by Elf Atochem S.A. under the tradename KYNAR™ 1000.

Example 4

The following are introduced into a 3.3 liter autoclave equipped with a stirrer, a jacket, and a temperature regulating system:

| | |
|---|---|
| deionied water | 1.3 l |
| ethyl acetate | 5 ml |
| sodium acetate | 0.073 g | water are added at the same time. 400 g of water and 112 g of $C_2F_3Cl$ were added over a copolymerization time of 4 h.

After cooling of the autoclave, the residual monomers are degassed and the contents of the autoclave are then discharged, filtered, and dried.

814 g of $VF3/C_2F_3Cl$ copolymer are recovered in the form of a powder of molar composition 90/10.

Example 7

The following are introduced into a 3.3 liter autoclave equipped with a stirrer, a jacket, and a temperature regulating system:

| | |
|---|---|
| deionized water | 1400 g |
| sodium acetate | 0.073 g |
| paraffin | 8 g |
| emulsifier ($C_6F_{13}C_2H_4SO_3K$) | 2.45 g |
| VF3 | 1022 g |
| $C_3F_6$ | 208 g |
| ethyl acetate | 28 ml |

After the autoclave has been heated to 83° C., 16 ml of a 0.5% by weight solution of potassium persulphate are introduced. The pressure is adjusted to 85 bar by the addition of 90 g of water. Further water (700 g) is added to compensate the pressure drop due to the copolymerization. The autoclave is then degassed.

A latex with a high solids content (27%) is formed. This is coagulated by freezing and then washed 3 times with 3 liters of a water/methanol mixture of composition 75/25 by weight. After washing, the latex is dried at 90° C. and 871 g of $VF3/C_3F_6$ copolymer are recovered in the form of a powder of molar composition 99/1.

The copolymer obtained is soluble in butyl acetate.

Example 8

The following are introduced, after deaeration, into a 3.3 liter autoclave equipped with a stirrer, a jacket, and a temperature regulating system:

| | |
|---|---|
| deionized water | 1400 g |
| ethyl acetate | 5 ml |
| sodium acetate | 0.073 g |
| paraffin | 8 g |
| emulsifier ($C_6F_{13}C_2H_4SO_3K$) | 2.45 g |
| VF3 | 1132 g |
| VF2 | 98 g |

After the autoclave has been heated to 83° C., 16 ml of a 0.5% by weight solution of potassium persulphate are introduced. The pressure is adjusted to 80 bar by the addition of 80 g of water. Further water (854 g) is added to compensate the pressure drop due to the copolymerization. The autoclave is then degassed.

A latex with a high solids content (27%) is formed. This is coagulated by freezing and then washed 3 times with 3 liters of a water/methanol mixture of composition 75/25 by weight. After washing, the latex is dried at 90° C. and 963 g of VF3/VF2 copolymer are recovered in the form of a powder of molar composition 90/10.

Example 9

A powdery $VF3/C_2F_4$ copolymer with a molar composition of 95/5 and a number-average molecular weight, Mn, of 170,000 is prepared under the operating conditions of Example 1.

Example 10

Preparation of a varnish

A solution with a solids content of 20% and a Brookfield viscosity of 0.8 Pa.s is prepared by dissolving the powdery copolymer obtained in Example 9 in butyl acetate.

A varnish is then manufactured from this solution and a copolymer consisting of 70% by weight of methyl methacrylate and 30% of ethyl acrylate ($\overline{Mn}$ 27,000; $\overline{Mw}$ 93,000), marketed by Rohm & Haas under the name B44, by mixing the following:

* 58.3 g of a solution of the $VF3/C_2F_4$ copolymer of Example 9 in butyl acetate;
* 25 g of a solution of B44 in butyl acetate (solids content 20%); and
* 25 g of butyl acetate.

The solids content of the varnish is 15.4%.

Use of $VF3/C_2F_4$ copolymer in a varnish

The varnish described above is deposited on a chromed aluminum plate using a 150 μm spiral doctor blade.

To test its suitability for use as a retouching varnish, it is also deposited on an aluminum plate which has already been coated with white paint based on PVDF.

By way of comparison, a retouching varnish is used which contains the same proportions of fluorinated copolymer, B44, and solvent except that the fluorinated copolymer has been replaced with a terpolymer which comprises 72 mol % of VF2, 18% of $C_2F_4$, and 10% of $C_3F_6$, and melts at 90° C.

The coated plates are dried either for 30 minutes at 80° C. or for 1 week at room temperature.

Table 2 lists the results of the measurements of such properties as adhesion, impact strength, gloss of the varnishes described above.

TABLE 1

| Ex. | Monomers | Molar proportions | M.p. (°C.) | $\overline{Mn}$ | $\overline{Mw}/\overline{Mn}$ | Brookfield viscosity (Pa · s) | % of polymer in solution | Transparency after 200% uniaxial stretching |
|---|---|---|---|---|---|---|---|---|
| 1 | VF3/$C_2F_4$ | 90/10 | 219 | 82,000 | 1.9 | 2.65 | 20 | breaks before 200% |
| 2 | VF3/$C_2F_4$ | 80/20 | 232 | 96,000 | 2.4 | 7.30 | 12 | transparent |
| 3 | VF2 | 100 | 170 | | | | | |
| 4 | VF3 | 100 | 204 | 83,000 | 2.2 | 6.75 | 20 | slightly transparent |
| 5 | VF2/$C_2F_4$ | 80/20 | 120 | | | | | transparent |
| 6 | VF3/$C_2F_3Cl$ | 90/10 | 193 | | | | | |
| 7 | VF3/$C_3F_6$ | 99/1 | 187 | 100,000 | 2.1 | 10.40 | 20 | transparent |
| 8 | VF3/VF2 | 96/10 | 191 | 146,000 | 1.9 | 62.00 | 20 | |

The gloss on a white background at 20° is measured according to standard ASTM D 523-85.

The adhesion is evaluated according to standard NFT 30-038.

The Persoz hardness is measured according to standard NFT 30-016.

The impact strength is expressed in meters for a weight of 1 kg.

The flexural strength is measured according to standard ISO 3270.

The gloss retention under QUV is measured according to standard ASTM 523-85.

TABLE 2

| Test/measurement | Varnish of Example 10 | Comparative varnish |
|---|---|---|
| appearance in pot | excellent | excellent |
| appearance of film | excellent | excellent |
| thickness of dry film | 14 µm ± 2 | 9 µm ± 2 |
| gloss on white background at 20° C. | 53.2% ± 1 | 62.1% ± 1 |
| adhesion to chromed Al | excellent | excellent |
| adhesion to white PVDF-coated Al | excellent | excellent |
| Persoz hardness | 2.72 | 231 |
| impact strength | >1 m | >1 m |
| flexural strength | excellent | excellent |
| gloss retention under QUV after 1000 h | 100% | 100% |

Use of VF3/$C_2F_4$ copolymer as ultraflexible material

Ultraflexible materials can be used in particular for the production of primary or secondary sheaths, plates, and/or deformable ferrules, tips, nipples, terminals, and connectors.

The copolymer of Example 2 is molded at 250° C. into a 0.7 mm thick plate. Its tensile mechanical properties are measured according to standard ASTM D 1708:

| stress at break | 15.4 MPa |
|---|---|
| elongation at break | 513% |
| modulus of elasticity | 250 MPa |

The cold (−30° C.) impact strength is measured for different fluorinated polymers according to the invention (Examples 1, 2 and 9), a PVDF (melting point 170° C.; $\overline{Mw}$ 285,000) marketed by Elf Atochem S.A. under the name KYNAR® 1000, and a PVF3 (melting point 199° C.; $\overline{Mw}$ 280,000).

The results are collated in Table 3.

TABLE 3

| Nature of the polymer | Izod impact strength (in J/m) |
|---|---|
| PVDF | 40 |
| PVF3 | 60 |
| VF3/$C_2F_4$ of example 9 | 280 |
| VF3/$C_2F_4$ of example 1 | 200 |
| VF3/$C_2F_4$ of example 2 | 180 |

What is claimed is:

1. A method of protecting a substrate, which comprises the step of coating said substrate with one or more heat stable fluorinated copolymers of trifluoroethylene and tetrafluoroethylene wherein said one or more heat stable fluorinated copolymers of trifluoroethylene and tetrafluoroethylene comprises from 96 to 70 mol % of trifluoroethylene, and from 4 to 30 mol % of tetrafluoroethylene.

2. The method of claim 1 wherein said coating step is preceded by a step which comprises mixing said one or more heat stable fluorinated copolymers of trifluoroethylene and tetrafluoroethylene with an organic or aqueous phase to form a varnish or paint and wherein said coating step comprises applying said varnish or paint to said substrate and subsequently removing said organic or aqueous phase.

3. The method of claim 1 wherein said coating step is preceded by a step which comprises extruding or coextruding a monolayer or multilayer film, sheath, or sleeve comprising said one or more heat stable fluorinated copolymers of trifluoroethylene and tetrafluoroethylene and wherein said coating step comprises applying said monolayer or multilayer film, sheath, or sleeve to said substrate.

4. The method of claim 1 wherein the heat stable fluorinated copolymers of trifluoroethylene and tetrafluoroethylene have a number average molecular weight, Mn, between 40,000 and 250,000.

5. An article of manufacture comprising a substrate coated with one or more heat stable fluorinated copolymers of trifluoroethylene and tetrafluoroethylene wherein said one or more heat stable fluorinated copolymers of trifluoroethylene and tetrafluoroethylene comprises from 96 to 70 mol % of trifluoroethylene, and from 4 to 30 mol % of tetrafluoroethylene.

6. The article of manufacture of claim 5 wherein said substrate comprises aluminum.

7. The article of manufacture of claim 5 wherein said substrate comprises an electrical circuit.

8. The article of manufacture of claim 5 wherein said substrate comprises an optical fiber.

9. The article of manufacture of claim 5 wherein the heat stable fluorinated copolymers of trifluoroethylene and tetrafluoroethylene have a number average molecular weight, $M_n$, between 40,000 and 250,000.

10. An article of manufacture comprising a member of the group consisting of a sheath, a plate, a ferrule, a tip, a nipple, a terminal, and a connector, wherein said member comprises one or more heat stable fluorinated copolymers of trifluoroethylene and tetrafluoroethylene wherein said one or more heat stable fluorinated copolymers of trifluoroethylene and tetrafluoroethylene comprises from 96 to 70 mol % of trifluoroethylene, and from 4 to 30 mol % of tetrafluoroethylene.

* * * * *